Figure 1:
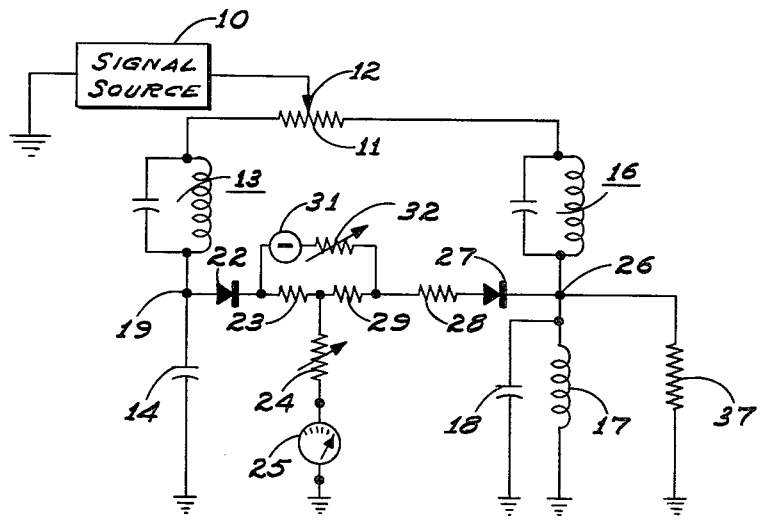

Aug. 14, 1962    S. L. BROADHEAD, JR., ET AL    3,049,667

FILTER CIRCUIT

Filed Jan. 20, 1959

INVENTORS
ARTHUR L. KEMPER
SAMUEL L. BROADHEAD JR.
BY

ATTORNEYS

United States Patent Office 3,049,667
Patented Aug. 14, 1962

3,049,667
FILTER CIRCUIT
Samuel L. Broadhead, Jr., Cedar Rapids, and Arthur L. Kemper, Marion, Iowa, assignors to Collins Radio Company, Cedar Rapids, Iowa, a corporation of Iowa
Filed Jan. 20, 1959, Ser. No. 787,877
7 Claims. (Cl. 324—82)

This invention relates generally to filter circuits and more particularly to a filter circuit for separating two signals, each having a different given frequency.

In certain electrical systems it is desirable to employ two or more signals each having a different frequency. For example, in the process of landing an aircraft, there is often used a system for indicating to the aircraft when it is approaching the landing field at the proper altitude and in the proper direction. Specifically, this system involves the transmission of two radiated electric field patterns, each at a different frequency. These two field patterns may lie one above the other, for controlling altitude, such that the plane of equal intensity of said two fields represents the proper altitude of the plane at any given distance from the point of contact.

Also transmitted are two additional fields, of different frequencies, which are positioned side by side in the space extending out beyond the landing strip to form a vertical plane of equal field intensity therebetween which indicates the azimuth the aircraft should be assuming at any point. The intersection of the two planes mentioned above indicates the glide path the aircraft should follow when approaching the landing strip.

It is the current practice to have one field of each of the two pairs of fields modulated by a 90 cycles per second (c.p.s.) signal and the other field of each of the pair of fields modulated by a signal having a frequency of 150 c.p.s. The receiving equipment on the aircraft must, consequently, be able to receive the signals forming the two fields that determine the altitude of the aircraft and also the signals forming the two fields that determine the azimuth of the aircraft. Further, the receiving equipment in the aircraft must be able to determine the relative amount of each of the fields of the two pairs of fields that it is receiving. For example, if the lower field of the two fields indicating proper altitude is modulated by a 90 c.p.s. signal and the aircraft is approaching at too low an altitude, then its receiving apparatus should indicate how much more intense the received 90 c.p.s. modulated signal is than the received 150 c.p.s. modulated signal. Such a receiving system ordinarily requires the removal first of the carrier signal thus leaving only the 150 c.p.s. signal and the 90 c.p.s. signal.

There are, in the prior art, many types of filters that can be employed to separate the two signals (i.e. the 90 c.p.s. signal and the 150 c.p.s. signal) and retain their proportionate magnitudes. Most of these filters, however, are constructed to have a high input impedance to match the high output impedance of the preceding stage which ordinarily is determined by the plate impedance of a vacuum tube employed in a preceding amplifier stage. It would be desirable to employ transistors instead of vacuum tubes in such preceding stages in some circuit applications. Such high input impedance filters have disadvantages when used in low impedance transistor circuits due to the impedance mismatch.

An object of the present invention is to provide a filter circuit of the type discussed above having a low input impedance.

A further purpose of the invention is to provide a filter which will produce, from an input signal of relatively low amplitude, a filtered output signal of high amplitude.

Another object of the invention is to provide an inexpensive filter of the type discussed above which is especially suitable for use with transistor circuits.

A fourth object of the invention is to provide a filter circuit which will provide a higher ratio between the amplitude of the passed signal and the amplitude of the signals which are to be attenuated, than has been known heretofore.

Another aim of the invention is to improve filters generally.

In accordance with the invention there is provided a signal source containing a component having a first frequency and a component having a second frequency. A first circuit means and a second circuit means are connected in parallel with each other with respect to said signal source. The first circuit means is comprised of a series arrangement of a first parallel tuned circuit and a capacitor. The parallel tuned circuit is tuned to the first given frequency and the series circuit which includes the parallel tuned circuit is tuned to the second frequency. Thus, the parallel tuned circuit functions to block said first frequency but will pass said second frequency. The signal component having said second frequency will appear across said capacitor with a magnitude determined by the Q of the series tuned circuit.

The second circuit means is comprised of a second parallel tuned circuit connected in series with an inductor. The second parallel tuned circuit is tuned to said second frequency and the series arrangement of said second tuned circuit and said inductor is tuned to said first frequency. Thus, the tuned parallel circuit will block the signal component having said second frequency and will function to pass the signal component having the first frequency; the latter signal component appearing across the said inductor with a magnitude equal to the Q of the series tuned circuit.

Means for determining the difference in voltage amplitude appearing across said capacitor and said inductor is provided and meter means responsive to said difference in amplitude also is provided.

Figure 2:
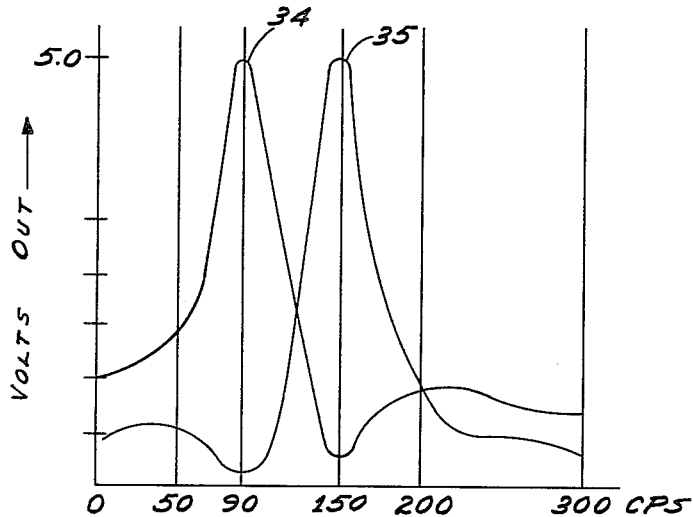

The above mentioned and other objects and features of the invention will be understood more fully from the following detailed description thereof when read in conjunction with the drawings in which:

FIG. 1 is a schematic sketch of the invention; and
FIG. 2 are curves showing the frequency response characteristics of different portions of the circuit of FIG. 1.

Referring now specifically to FIG. 1 the signal source 10 is constructed to produce two signals, the first of said signals having a first given frequency and the second of said signals having a second given frequency. Let it be assumed that these two frequencies are 90 c.p.s. and 150 c.p.s. respectively, which frequencies are today in common use in aircraft equipment. These two signals are supplied to a resistor 11 through variable tap 12. From the tap 12 the signal is applied to two paths connected in parallel, the first of these paths includes parallel tuned circuit 13 connected in series with a capacitor 14.

The second of these two parallel paths includes a parallel tuned circuit 16 connected in series with an inductor 17 across which is shunted an R.F. bypass capacitor 18 and a thermistor 37 which performs the function of compensating for changes in the circuit due to changes in temperature.

The parallel tuned circuit 13 is tuned to a frequency of 150 c.p.s. To a signal having a frequency less than 150 c.p.s. the tuned circuit 13 appears as an inductive nature. The capacitor 14 is selected to have a value such that at a frequency of 90 c.p.s. the series circuit formed by the capacitor 14 and the resultant inductive reactance of the tuned circuit 13 will be resonant. Thus, the tuned circuit 13 will function to block the signal component having a frequency of 150 c.p.s. but will pass the signal component having a frequency of 90 c.p.s.; the last mentioned signal appearing at the point 19 with an amplitude determined by the Q of the series resonant circuit.

The tuned circuit 16 is tuned to the resonant frequency of 90 c.p.s. To a signal whose frequency is greater than 90 c.p.s. the tuned circuit 16 will appear as a capacitor.

The inductor 17 is selected to have a value such that at a frequency of 150 c.p.s. the series circuit formed by the inductor 17 and the capacitive reactance of parallel circuit 16 will be resonant. Thus the tuned circuit 16 will function to block the component of the applied signal having a frequency of 90 c.p.s. and will pass the signal component having a frequency of 150 c.p.s. The last mentioned signal component will appear across the inductor 17. In the event that signal components having higher frequencies exist in the applied signal, the by-pass capacitor 18 is provided to avoid large voltages being produced across inductor 17.

The voltage appearing at point 19 will produce a current flow through diode 22, resistive impedance 23, variable resistor 24, and meter 25 to ground potential. The voltage appearing at the point 26 will produce a current flow through the diode 27, resistive impedance 28, resistor 29, variable resistor 24, and meter 25 to ground. From an inspection of FIG. 1 it can be seen that the asymmetrical devices 22 and 27 are arranged in the circuit so as to produce additive D.C. voltage components across the resistors 23 and 29 and to produce voltages in the resistor 24 which are of opposing polarity. Ignoring the effect of resistor 28 for the moment and assuming that the circuit is balanced and that the voltages appearing at points 19 and 26 are equal in magnitude it can be seen that the total voltage drop appearing across resistor 24 is zero, but that the voltage drop appearing across resistors 23 and 29 is equal to the sum of the voltages appearing at terminals 19 and 26 (after rectification by the diodes 22 and 27).

The primary functions of the resistors 23 and 29 are two-fold. Firstly, they function to prevent an excessive current which might otherwise flow through diodes 22 and 27. Secondly they provide an ever present voltage when the circuit is operative. Thus the series arrangement of an indicator means 31 and a resistor sensitivity adjusting means 32 connected across the resistors 23 and 29 can be employed to indicate when the circuit is operative. The indicating element 31 can be constructed similarly to a voltmeter but having a colored flag attached to the needle thereof, which, in the presence of a minimum voltage, will be deflected to cause the colored flag to appear in a window of the indicator. The sensing adjustment 32 is provided to establish the said minimum voltage.

Referring again to the meter 25, said meter is constructed to indicate the polarity and the magnitude of the current passing therethrough. It can be seen from FIG. 1 that if the magnitude of the signal appearing at terminal 19 is greater than that appearing at terminal 26 that a resultant positive current will flow from terminal 19 through diode 22, resistors 23 and 24, and the meter 25. The meter needle will be deflected in one direction, say to the right, a certain angular distance, to indicate the polarity and the magnitude of the current flow thereof. Conversely, if the amplitude of the signal appearing at terminal 26 is greater than that appearing at terminal 19 the resultant negative current flow through the meter 25 will deflect the needle indicator thereof to the left a certain angular distance, which deflection will indicate the polarity and the magnitude of the current flow therethrough.

When this circuit is employed to determine the glide path of an aircraft, the deflection of the needle of meter 25 either to the left or to the right will indicate the direction of the error and the amount of the error of the actual path of the aircraft with respect to the desired glide path.

The resistor 28 is employed in the circuit to compensate for nonlinearity in the inductor of the tuned circuit 16 and the inductor 17. More specifically, if the signal level of the applied signal should decrease, the permeability of the inductor of tuned circuit 16 and inductor 17 also would decrease somewhat. Such decrease in permeability would tend to lower the Q of the series resonant circuit (comprising tuned circuit 16 and inductor 17) at resonance and, consequently, would tend to lower disproportionately the amplitude of the signal appearing at the terminal 26. The resistor 28 functions to produce a certain voltage drop in the circuit at some selected input signal level. The circuit components are selected so that with this certain voltage drop across the resistor 28 the circuit is properly balanced at said selected input signal level. If the signal level should decrease so as to disproportionately decrease the signal appearing at the terminal 26, there will be produced across the resistor 28 an incremental decrease in voltage drop for which there is no corresponding voltage change in the other half of the circuit. Thus the resistor 28 tends to compensate for the nonlinearity introduced into the circuit due to the inductors of tuned circuit 16 and the inductor 17.

Referring to FIG. 2 there are shown two frequency response curves 34 and 35. The curve 34 is the frequency response curve for the circuit including the tuned circuit 16 and the inductor 17 while the curve 35 shows the frequency response characteristics of a tuned circuit 13 and a capacitor 14.

It can be seen from curve 34 that tuned circuit 16 presents a high impedance to a 90 c.p.s. signal but that the combination of the tuned circuit 16 and the inductor 17 function to present a low impedance to a 150 c.p.s. signal. Similarly, from curve 35 it can be seen that the tuned circuit 13 presents a high impedance to a 150 c.p.s. signal but that the combination of the tuned circuit 13 and the inductor 14 presents a low impedance to the 90 c.p.s. signal.

It is to be noted that the form of the invention shown herein is but a preferred embodiment thereof and that various changes may be made in the circuit without departing from the spirit or the scope of the invention.

We claim:
1. Filter circuit means for separating signal components having different frequencies, comprising an input means having output terminals, first and second circuit means connected in parallel arrangement with respect to said input means, said first circuit means comprising a first parallel tuned circuit tuned to a first frequency, and a capacitor means connected in series arrangement with said first parallel tuned circuit to form a series circuit tuned to a second frequency, said second circuit comprising a second parallel tuned circuit tuned to said second frequency and an inductor means connected in series therewith to form a second series circuit tuned to said first frequency, said capacitor means and said inductor means each being connected between the parallel tuned circuit in series therewith and a common output terminal of said input means, means for combining the signals appearing across said capacitor means and said inductor means to produce an output signal indicative of the difference in amplitude of said signals appearing across said capacitor means and said inductor means.

2. Circuit means in accordance with claim 1 in which said means for combining signals comprises first asymmetrical means, first impedance means, second impedance means, and second asymmetrical means connected in series arrangement in the order recited between the common terminal of said first parallel tuned circuit and said capacior means and the common terminal of second parallel tuned circuit and said inductor means, said first and second asymmetrical means being connected in similar polarity with respect to each other, and meter means connected between the common terminal of said first and second impedance means and the other terminals of said capacitor means and said inductor means.

3. Filter circuit means in accordance with claim 2 including means for indicating the operative condition of said filter circuit means comprising a voltage indicating device connected across at least a portion of said first and second impedance means.

4. Filter circuit means for separating signal components having different frequencies, comprising an input means having output terminals, first and second circuit means connected in parallel arrangement with respect to said input means, said first circuit means comprising a first parallel tuned circuit tuned to a first frequency, and a capacitor means connected in series arrangement with said first parallel tuned circuit to form a series circuit tuned to a second frequency, said second circuit comprising a second parallel tuned circuit tuned to said second frequency and an inductor means connected in series therewith to form a second series circuit tuned to said first frequency, said capacitor means and said inductor means each being connected between the parallel tuned circuit in series therewith and a common ouput terminal of said input means, means for rectifying and combining the signals appearing across said capacitor means and said inductor means to produce an output signal whose amplitude is indicative of the difference in amplitude of the signals appearing across said capacitor means and said inductor means and whose polarity indicates which of the signals appearing across said inductor means and said capacitor means has the larger amplitude.

5. Filter circuit means in accordance with claim 4 in which said means for rectifying and combining signals comprises first asymmetrical means, first impedance means, second impedance means, and second asymmetrical means connected in series arrangement in the order recited between the common terminal of said first parallel tuned circuit and said capacitor means and the common terminal of second parallel tuned circuit and said inductor means, said first and second asymmetrical means being connected in similar polarity with respect to each other, and meter means connected between the terminal between said first and second impedance means and the other terminals of said capacitor means and said inductor means.

6. Filter circuit means in accordance with claim 5 including means for indicating the operative condition of said filter circuit comprising a voltage indicating device connected across at least a porton of said first and second impedance means.

7. Filter circuit means for separating signal components having a first frequency and a second frequency, comprising an input means, first and second circuit means connected in parallel arrangement with respect to said input means, said first circuit means comprising a first parallel tuned circuit tuned to a first frequency, and a capacitor means connected in series arrangement with said first parallel tuned circuit to form a series circuit tuned to a second frequency, said second circuit comprising a second parallel tuned circuit tuned to said second frequency and an inductor means connected in series therewith to form a second series circuit tuned to said first frequency, said first and second parallel tuned circuits being connected to said input means, means for combining the signals appearing across said capacitor means and said inductor means to produce an output signal indicating which of said signals appearing across said capacitor means and said inductor means has the greater amplitude.

References Cited in the file of this patent

UNITED STATES PATENTS

| 1,568,141 | Elsasser | Jan. 5, 1926 |
| 1,601,070 | Horton | Sept. 28, 1926 |
| 2,264,151 | Reid | Nov. 28, 1941 |
| 2,341,240 | Reid | Feb. 8, 1944 |
| 2,871,348 | Hutchinson | Jan. 27, 1959 |
| 2,944,215 | Corson | July 5, 1960 |

FOREIGN PATENTS

| 101,989 | Australia | Sept. 6, 1937 |
| 607,174 | Great Britain | Aug. 26, 1948 |
| 712,527 | Great Britain | July 28, 1954 |
| 727,434 | Great Britain | Mar. 30, 1955 |